No. 631,917. Patented Aug. 29, 1899.
W. R. WYNNE.
SIGNALING AND CONTROLLING APPARATUS FOR MOTOR VEHICLES.
(Application filed Mar. 30, 1899.)
(No Model.) 2 Sheets—Sheet 1.
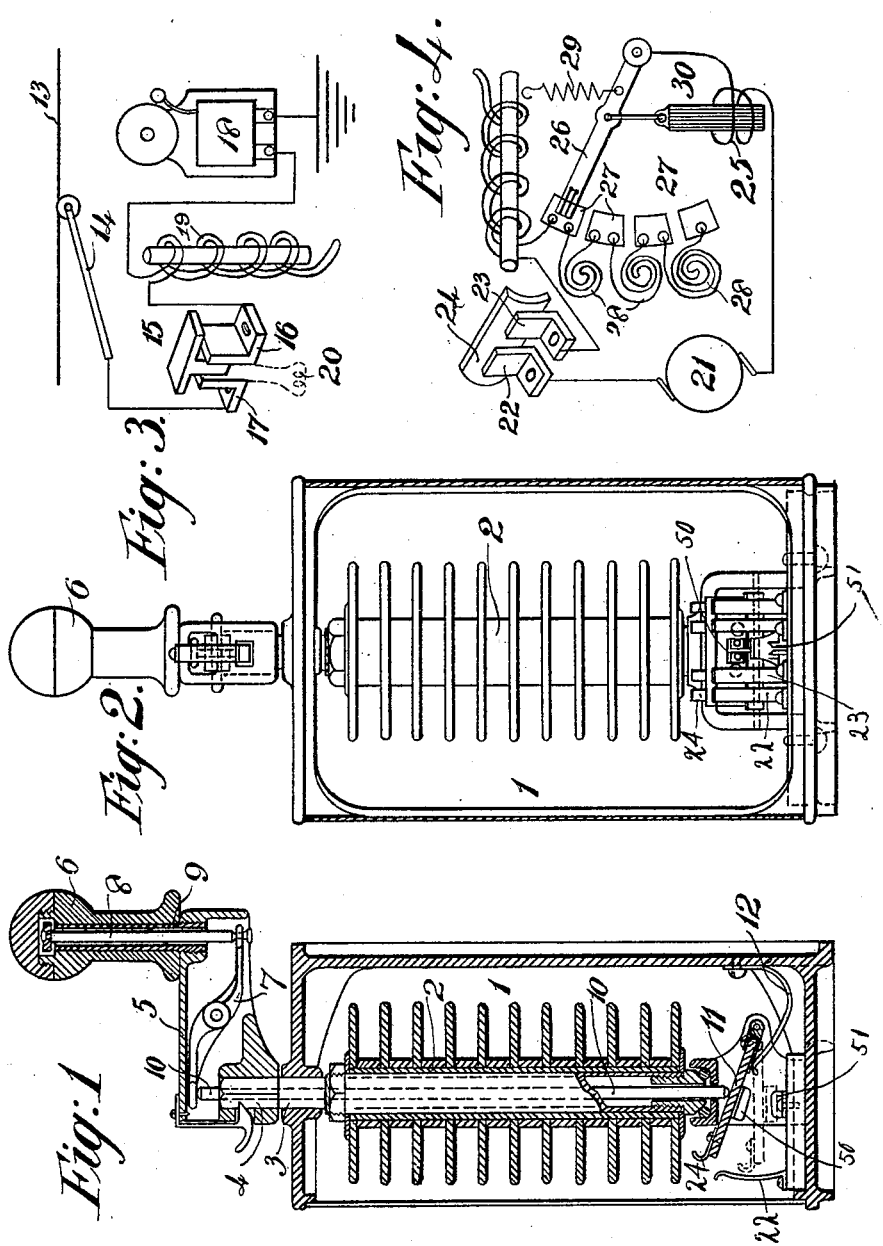
Witnesses
Edwin Drew Bartlett.
Frank J. Ames
Inventor
William Richard Wynne
per Herbert Sefton-Jones
Attorney No. 631,917. Patented Aug. 29, 1899.
W. R. WYNNE.
SIGNALING AND CONTROLLING APPARATUS FOR MOTOR VEHICLES.
(Application filed Mar. 30, 1899.)
(No Model.) 2 Sheets—Sheet 2.
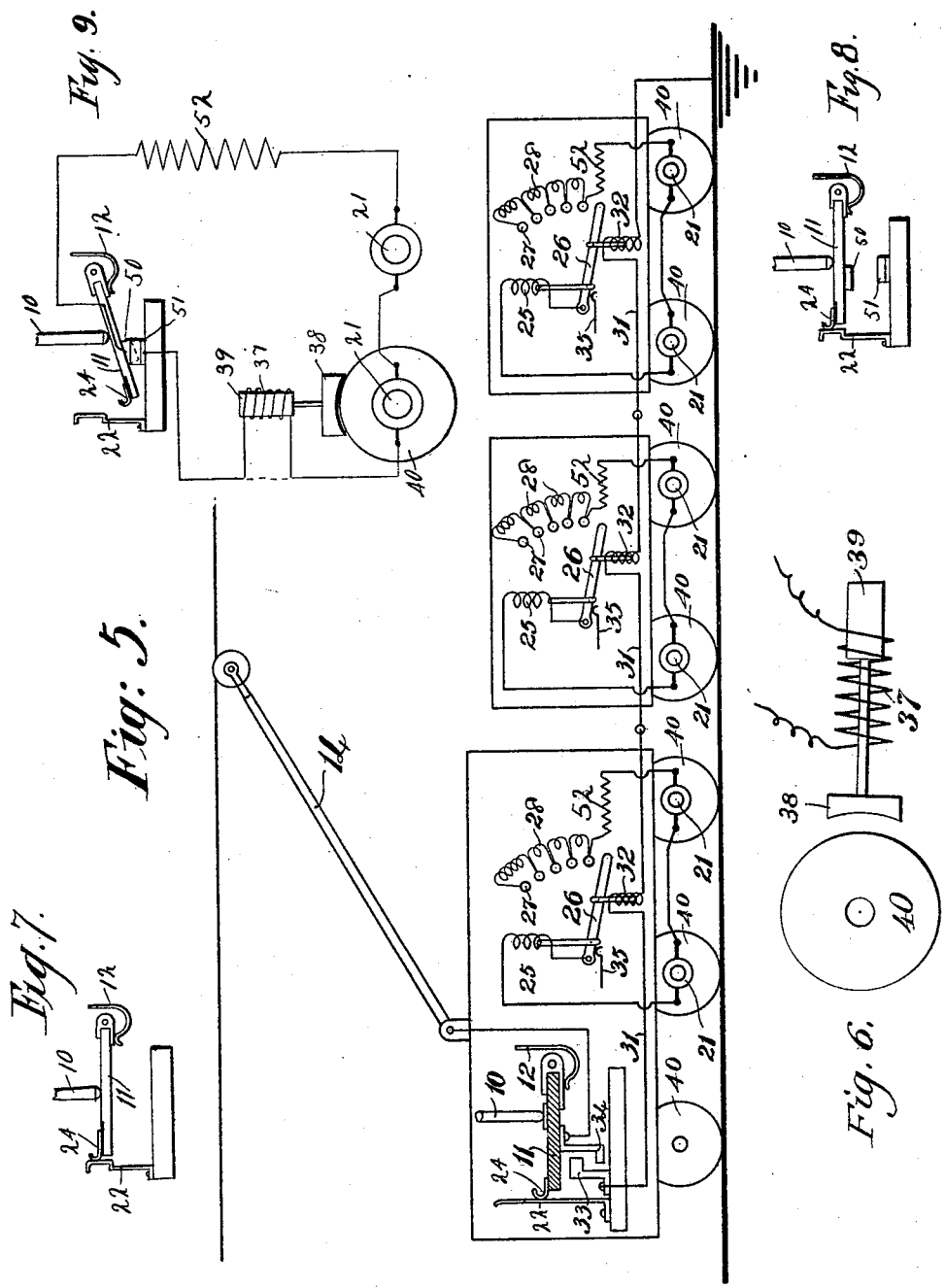
Witnesses
Edwin Drew Bartlett.
Frank J. Ames
Inventor
William Richard Wynne
per Herbert Sefton Jones
Attorney

UNITED STATES PATENT OFFICE.

WILLIAM RICHARD WYNNE, OF LONDON, ENGLAND.

SIGNALING AND CONTROLLING APPARATUS FOR MOTOR-VEHICLES.

SPECIFICATION forming part of Letters Patent No. 631,917, dated August 29, 1899.

Application filed March 30, 1899. Serial No. 711,160. (No model.)

*To all whom it may concern:*

Be it known that I, WILLIAM RICHARD WYNNE, electrical engineer, a subject of the Queen of Great Britain, residing at 42 Palace Mansions, Addison Bridge, London, England, have invented a new and useful Improvement in Signaling and Controlling Apparatus for Motor-Vehicles, of which the following is a specification.

My invention relates to signaling and controlling apparatus for electric-motor vehicles.

The object of my invention is to provide means whereby the driver of a motor-vehicle is enabled, by means of an additional movement of the controller-handle, to give warning-signals or cause the brakes to be applied without leaving go of the handle.

A further object of my invention consists in providing a special device, which I term the "graduator," for preventing the brakes from being applied too quickly through an excessive current being passed around the brake-magnets when the vehicle is traveling at a high rate of speed.

My invention also comprises a system of electric brakes applicable to a train of vehicles, whereby if by any chance some of the vehicles become detached the brakes are immediately applied throughout the entire train. I also arrange that the application of the brakes shall be controlled by the motorman or conductor, if desired.

My invention will be readily understood by the following description, in which reference is made to the accompanying drawings.

Figure 1 is a sectional elevation of a controller constructed in accordance with my invention, various parts being removed. Fig. 2 is a front elevation of the same. Fig. 3 is a diagram of circuits arranged for operating an alarm-bell according to my invention. Fig. 4 is a diagram illustrating what I call the "graduator." Fig. 5 is a diagram illustrating my improved system for applying brakes to a train of vehicles. Fig. 6 is a typical illustration or diagram of an electromagnetic brake ready to operate upon a wheel of the car. Fig. 7 is an elevation of the modification of the switch shown at the bottom of Figs. 1 and 2. Fig. 8 shows another modification of the switch. Fig. 9 shows the switch in a depressed condition, the circuits, as hereinafter described, being also reproduced.

Referring now to Figs. 1 and 2, 1 is the controller-casing, within which is located the controller-drum 2, which is provided with contact-strips adapted to coöperate with fixed contacts. (Not shown in the drawings, and which form no part of my invention.) The controller-drum is mounted upon a shaft 3, having a squared upper end 4, for receiving the operating-crank 5, provided with the usual insulating-handle 6. According to my invention I make the crank 5 hollow and locate within it a pivoted lever 7, the outer end of which is connected with a rod 8, sliding in a tube 9, secured to the crank. The insulating-handle 6 is adapted to move vertically on the tube 9 and to carry with it the rod 8, thereby rotating the lever 7 on its pivot. The inner end of the lever 7 engages with the top of the rod 10, which can slide up and down within the axle 3 of the controller-drum, and the lower end of said rod engages with a pivoted switch-arm 11, which, through the agency of a suitable spring 12, continually presses the rod 10 upward, and thereby maintains the parts in the position shown in Fig. 1. It will readily be seen that on vertically raising the handle 6 the rod 10 will be depressed through the rotation of the lever 7 and will thereby depress the switch-arm 11. I may arrange that such depression of the switch-arm makes or breaks a circuit, or it may make one circuit and break another, or the movement of the switch-arm may be caused to make or break circuits in succession, as may be desired.

The switch-arm 11 is shown in a partially-depressed condition in Fig. 7, from which it will be seen that the bridge-piece 24, attached to the switch-arm, breaks contact with an upright spring 22. Said bridge-piece also makes contact with a second upright spring 23, (see Fig. 4,) parallel to the first spring. These two springs are also shown in front elevation in Fig. 2. Consequently in this case the depression of the switch-arm makes a circuit. In Fig. 5 the switch-arm 11 is also shown in its depressed position, and it will be seen that not only does the bridge-piece 24 connect with the upright spring 22, (and with the spring 23,) parallel with it, (not shown in Fig. 5;) but also such depression is operated to break the circuit between two contacts 33 and 34, which contacts are included in the circuit from the trolley-pole to the wire 31. The depression of the switch-arm makes one circuit (by means of the bridge-piece 24 engaging with the springs 22 23) and breaks another—namely, between the contacts 33 and 34). As to the movement of the switch-arm making or breaking circuits in succession, it is obvious that instead of making one circuit the connecting-springs 22, for example, may be arranged so that further depression of the switch-arm breaks the circuit previously made and makes another circuit. This would be done by making springs of different shapes, so that their operative contact-surfaces were connected by bridge-pieces secured to the switch-arm 11 at different places during the movement of the switch-arm. In Fig. 2 there are two sets of contact-springs shown, 22 23. The second pair of contact-springs can be used for any other circuit which it is desired the depression of the switch-arm shall make.

In Fig. 8 I have shown a similar arrangement to Fig. 7; but two fresh contacts are indicated, and the depression of the switch-arm 11 first of all makes the circuit by means of the bridge-piece 24 touching the springs 22 23, and then a further depression will break such circuit and make another circuit by the connection of the contacts 50 51. By this means after the conductor has rung an alarm-bell through making a circuit through bridge-piece 24, a further depression of the arm will stop the alarm-bell ringing and make a circuit which causes an electric brake to be applied. Such a circuit, for example, is shown in Fig. 9, in which an electromagnetic coil 37 is included, acting on a core 39, attached to the brake-block 38, which is applied to the car-wheel 40. The current for operating this electromagnet is in Fig. 9 supplied from the car-motors which are acting as dynamos, being rotated by the momentum of the car, such use of the car-motors being of course well known in the art; or the electromagnetic brake-motor 37 38 39 may be omitted altogether and the circuit through the car-motors be completed, as shown in the dot and dash lines in Fig. 9, the idea being that the car-motors acting as dynamos send a current through a resistance 52, and this of course absorbs energy, and as the energy is only supplied by the momentum of the car, the car will be quickly brought to rest. This idea is also known in the art.

The diagram Fig. 3 shows the circuit for ringing the alarm-bell, 13 being the trolley-wire, from which current is conducted to the vehicle through the trolley-arm 14, and 15 being a contact carried by the switch-arm 11, which when the arm is depressed makes connection between two contacts 16 17, thereby completing the circuit through the bell 18. In order to prevent sparking at the contacts 16 17 when the circuit is broken, due to the high electromotive force with which motor-vehicles are usually operated, I provide a non-inductive resistance 19 in series with the bell 18. In place of the bell an electric lamp may obviously be provided, and in place of or in addition to the resistance 19 I sometimes use a shunt across the contacts 16 17, as shown in dotted lines at 20, such shunt being either a carbon resistance or a condenser or a wire resistance having large self-induction.

I preferably arrange that the raising of the handle 6 a certain amount shall complete the circuit through the bell by connecting the contacts 16 17, as above described, and that a further movement of the handle in the vertical direction, which causes a further corresponding downward movement of the switch-arm 11, shall operate to complete the circuit which controls the electric brakes either directly or indirectly. For example, in the case of a vehicle propelled by electric motors mechanically connected to its wheels in the usual manner I may arrange that the further downward movement of the switch-arm 11 shall short-circuit the motors through a suitable resistance, whereby the motors being caused to act as dynamos send a current through the resistance, the energy being supplied by the momentum of the vehicle, which is thereby gradually brought to rest. This is explained above with reference to Figs. 9 and 5, because the further downward movement of the switch-arm 11 in those figures breaks the circuit in the wire 31 at the contacts 33 and 34, and this breaking of the circuit causes the car-motors 21 to be short-circuited through a resistance 37 28, and the motors are caused to act as dynamos, as above mentioned.

In order to prevent the speed being checked too suddenly when the vehicle is traveling at a high rate, I prefer to use what I call a "graduator," which is indicated diagrammatically in Fig. 4, 21 being the car-motor, which when the circuit is completed between the contacts 22 23 by the bar 24, carried by the switch-arm 11, sends a current around the coil 25 and through the pivoted arm 26, which is adapted to make contact with a series of plates 27, and thereby include one or more resistances 28 in circuit with the motor. The arm 26 is normally held in a raised position by means of a spring 29, but when a current flows around the coil 25 the core 30, being attracted, pulls down the arm 26 and causes more or fewer of the resistance-coils 28 to be included in circuit with the motor, thereby cutting down the current. It is obvious that the greater the current passing around the coil 25 the more resistance will be included in circuit, and as the current is lessened the resistance will be lessened by the movement of the arm 26. I preferably so arrange the resistances in the brake-circuit that the braking effect is maintained by the graduator at a point which is under the point at which skidding of the wheels of the vehicle would take place. As the speed of the vehicle is reduced the resistance is gradually cut out of circuit until the limit is reached, when the momentum of the vehicle will not supply sufficient energy to cause the wheels to skid, and the vehicle then comes gradually to rest.

In Fig. 5 I have shown a braking-circuit similar to that shown in Fig. 4 applied to each of a train of vehicles. Said braking-circuit in this instance is not, however, completed directly by the movement of the switch-arm 11; but the movement of said arm is caused to break a circuit 31, which normally connects the trolley-arm 14 with the ground. Said circuit includes electromagnetic devices, (indicated diagrammatically at 32,) which as long as a current is flowing in said circuit maintains the graduator-arm 26 away from the contacts 27 and thereby breaks the braking-circuit. If, however, the circuit 31 is interrupted either by the train parting or by the movement of the switch-arm 11, separating the contacts 33 34, the electromagnetic mechanism 32 no longer acts, and the graduator-arm 26, under the influence of the spring indicated at 35, moves into contact with the first contact 27 and thereby establishes the circuit through the braking-dynamos 21, which are connected with the wheels of the vehicle. These dynamos may be either special dynamos employed only for braking purposes or may consist of the ordinary car-motors for moving the vehicles when supplied with current. The strength of the current from the braking-dynamos will be graduated automatically by the operation of the electromagnetic coil 25 in the manner already mentioned.

52 is merely an extra resistance-coil between the lowest coil 28 and the dynamo, so that when desired there may be some resistance left in circuit with the dynamos on the axles when the circuit-closer 26 is still upon the lowest of the terminals 27 belonging to the resistance-coils 28. The coils 52 may be omitted without departing from the spirit of the invention, or the resistance-coil 52 may be replaced by a magnet-coil 37, which is shown in Fig. 6 and described as follows, together with its adjuncts:

37 is a typical representation of the brake-magnet, which may be employed when energized by the current to apply the brake to the wheels of the train in the ordinary manner of electromechanical brakes. It is connected up between the dynamos 21, operated by the axles of the car, and the resistances 28, so that whenever the circuit-closer 26 is in contact with another resistance terminal 27 the brake-magnet 37 in each case will be in circuit with the dynamo; but it will not be in circuit of the trolley. These magnets 37 therefore are in a normally-open circuit with the dynamos, so that the train will not have the brakes applied when the dynamos 27 or motors are in circuit with the trolley 14.

In Fig. 6 a wheel of the car is shown by itself and is numbered 40. 38 is a brake adapted to be pressed on the wheel when the current passes through the coil 37, containing the core 39, which carries the brake 38.

What I claim is—

1. In a controller for electric motors, the combination of the controller-drum, a handle for rotating same which is also capable of a vertical movement, a rod sliding within the axle of the drum, means connecting the said rod and handle whereby a vertical movement of the handle causes a similar movement of the rod, and an electric switch governed by said rod.

2. In a controller for electric motors the combination with the controller-drum of a removable crank, a handle for rotating same which is also capable of a vertical movement, a rod sliding within the axle of the drum, means connecting the said rod and handle whereby a vertical movement of the handle causes a similar movement of the rod, an electric switch in the path of said rod, said means consisting of a lever 7, located in the said crank 5, which is hollow, and pivoted thereto, one end of the lever having a pivoted connection with said handle through the agency of a rod 8, connected to said handle, and the other end of said lever resting upon first said rod 10, and a spring 12, normally pressing the rod 10, upward and thereby maintaining the said handle 6, in its lowest position.

3. In a controller for electric motors, the combination with the controller-drum of a crank for rotating same, a handle for operating said crank capable of a vertical movement, a lever pivoted to said crank and connected at its outer end with the handle, and a rod sliding within the axle of the drum having its upper end in operative connection with the inner end of the lever, substantially as described.

4. The combination of a controller for electric motors, a handle for rotating same which is also capable of a vertical movement, a circuit including an electric alarm-signal, a switch for closing said circuit, and means operatively connecting said switch and the controller-handle whereby a vertical movement of said handle opens or closes the alarm-circuit.

5. In an automobile-vehicle, the combination of a braking-dynamo rotated by the movement of said vehicle, an electric circuit supplied with current from said dynamo, a switch in said circuit, an electromagnetic mechanism for controlling said switch operated by current flowing in a separate circuit, a controller for regulating the supply of electric current to the motor propelling said vehicle, a handle for operating said controller which handle is also capable of a vertical movement, and a switch in the circuit of the electromagnetic mechanism adapted to be opened and closed by a vertical movement of the controller-handle.

In witness whereof I have hereunto set my hand in presence of two witnesses.

WILLIAM RICHARD WYNNE.

Witnesses:
 FREDERICK WILLIAM LE TALL,
 B. BRAY.